May 5, 1959 E. M. NEELY 2,884,959
GOGGLE VALVE STRUCTURES
Filed May 25, 1955 2 Sheets-Sheet 1
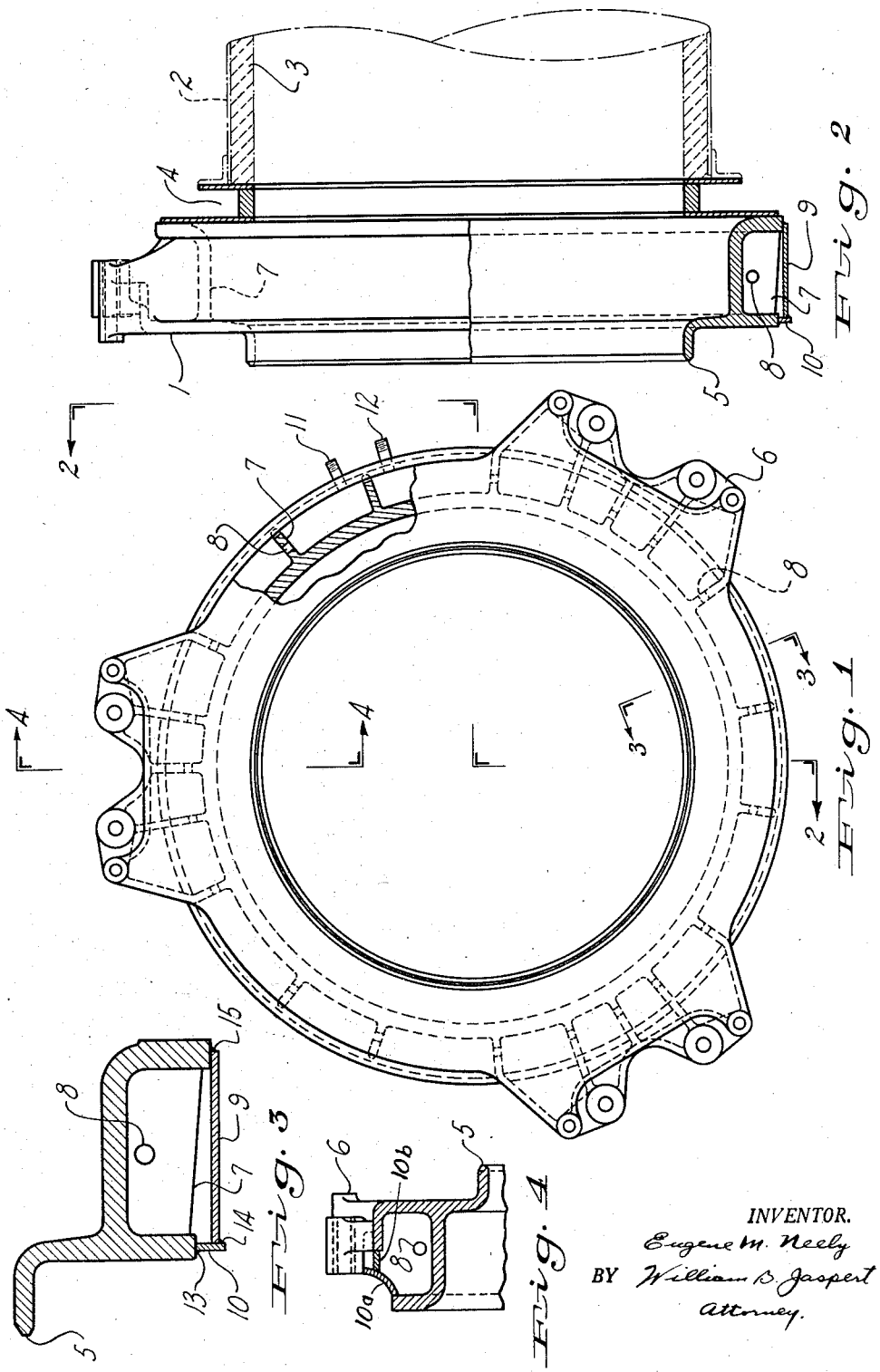
INVENTOR.
Eugene M. Neely
BY William B. Jaspert
Attorney.

May 5, 1959  E. M. NEELY  2,884,959
GOGGLE VALVE STRUCTURES
Filed May 25, 1955  2 Sheets-Sheet 2
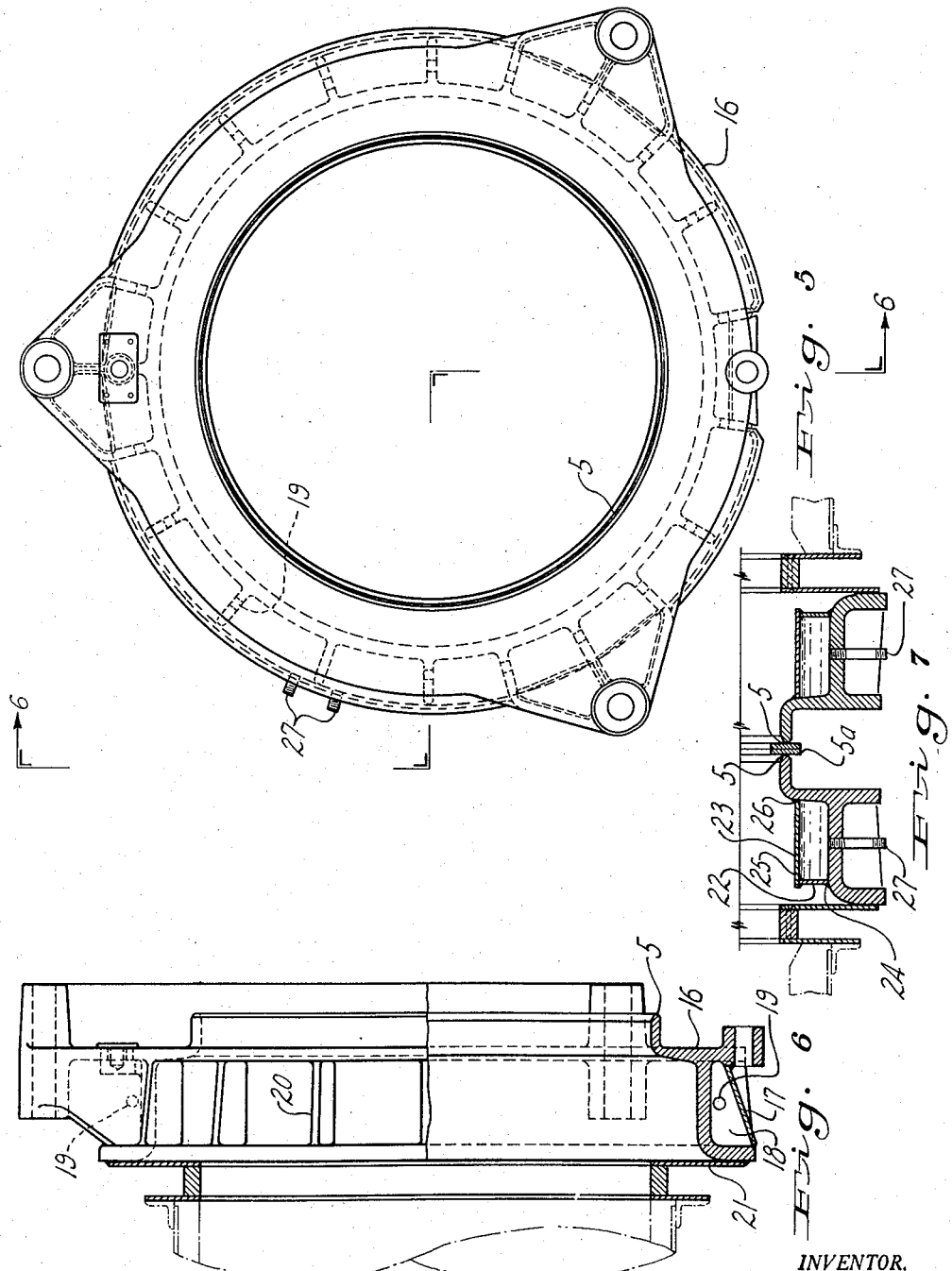
INVENTOR.
Eugene M. Neely
BY William B. Jaspert
Attorney

United States Patent Office 2,884,959
Patented May 5, 1959

2,884,959

GOGGLE VALVE STRUCTURES

Eugene M. Neely, Pittsburgh, Pa., assignor to William M. Bailey Company, Pittsburgh, Pa., a corporation of Pennsylvania Application May 25, 1955, Serial No. 510,939

1 Claim. (Cl. 138—94.3)

This invention relates to new and useful improvements in goggle valve structures of the thermal expansion type and more particularly to improved anchor flanges forming parts of the valve that are connected to a gas main. Valves of this type are employed for blast furnace, gas washer and boiler plant gas mains and are at times subjected to extremely high temperatures above 1000° F., and it is among the objects of the present invention to provide an anchor flange for goggle valves which is water cooled and in which the water jacket is leak proof, of substantial capacity, and is built into the flange structure in a manner to not interfere with the structural design of strengthening ribs, etc.

The invention will become more apparent from a consideration of the accompanying drawing constituting a part hereof in which like reference characters designate like parts and in which:

Fig. 1 is a front elevational view, partially in section, of a rod anchor flange for goggle valves embodying the principles of this invention;

Fig. 2 is a side elevational view thereof, partially in cross-section, taken along the line 2—2 of Fig. 1;

Fig. 3, a cross-section taken through the rod anchor flange along the lines 3—3 of Fig. 1;

Fig. 4, a similar view taken on the line 4—4, Fig. 1;

Fig. 5, a front elevation of an anchor flange;

Fig. 6, a side elevation, partially in section, taken on the line 6—6 Fig. 5; and Fig. 7, a cross-sectional view of a fragmentary portion of the flange assembly of a modified form of goggle valve with the seats extending beyond the outer periphery of the anchor flanges.

With reference to the drawing, the numeral 1 generally designates the goggle valve rod anchor flange which is about 7 feet in diameter, of which there are two in juxtaposed relation, as shown in Fig. 7. These valve flanges are attached to a gas main like main 2, having a refractory lining 3, a space 4 being provided for receiving an expansion joint, not shown. The inner face of the flange 1 is provided with a valve seat 5 which engages the goggle plate 5a, Fig. 7, that controls the flow of gases from the main through the valve, the goggle plate being no part of the present invention.

The flange 1 is further provided with lugs 6 to which expansion elements consisting of rods and tubes are anchored to effect movement of the other valve flange in the direction of the seat 5 to sealingly engage the goggle plate or to release the same in the operation of the valve. The general construction of the thermal and valve operating mechanism are no part of the present invention and no further illustration or description thereof is deemed necessary to an understanding of the invention which consists of the following:

Radial ribs 7 are provided in the valve flange 1 having openings 8 extending through the ribs to provide for the flow of water in the flange housing which is constituted by an annular housing plate 9 welded to the outer edge of the flange 1, a short radial plate 10 being provided to increase the area or space in the water jacket of the flange. As shown in Fig. 4, steel strips 10a and 10b are welded to the lugs 6 of the flange to provide a continuous cooling chamber. Fluid connections 11 and 12 supply a cooling fluid to the jacket chamber, one of the connections being an inlet and the other an outlet so that circulation is effected to cool the entire flange unit. By employing the welded plates 9, 10, 10a and 10b there are no water leaks and efficient cooling is effected. The construction of the water chamber or cooling jacket is more clearly shown in Fig. 3 of the drawing where the numerals 13, 14 and 15 designate the welded portions of the plates and flange.

The rod anchor flange, like the flange 1, constitutes only one-half of the valve housing, there being a similar anchor flange 16 shown in Fig. 5 connecting the other end of the gas main, as shown in Fig. 7, with its valve seat in alignment with the valve seat 5 of the rod anchor flange 1 and the goggle valve 5a disposed therebetween.

In the anchor flange of Fig. 6, the plate 17 is shown modified to provide a smaller cooling chamber 18 with communicating openings 19 in the ribs 20. Plate 21 is welded to the back of the flange to allow for expansion in the joint 4.

In the form of the invention shown in Fig. 7, the goggle valve seats 5 extend beyond the outer periphery of the anchor flanges and the plates 9 and 17 are eliminated and a water jacket constructed of steel strips 22 and 23 welded at 24, 25 and 26 is provided adjacent goggle valve seats 5 where extremely high temperature conditions prevail. Water inlet and outlet connections 27 are provided on opposite sides of a partition, not shown, for circulating the cooling fluid in the water jacket.

It is evident from the foregoing description of the invention that anchor flanges for thermal expansion valves made in accordance therewith may be exposed to high temperatures without impairing the alignment of the valve seats and the operating connected parts, by virtue of the efficient water cooling of the entire valve body. It is further noted that circulation of the cooling medium is expedited by the opening between the ribs 7 and the outer plate 9, while the holes 8 in the ribs, with the exception of the rib between the water connections 11 and 12, further expedite the circulation of the cooling medium.

Although two embodiments of the invention have been herein illustrated and described, it will be evident to those skilled in the art that various modifications may be made in the details of construction without departing from the principles herein set forth.

I claim:

In a goggle valve structure, anchor flanges of substantially h-shape cross-section having an axial flange terminating in a valve seat and having angularly spaced perforated ribs across the legs of the h-shape section, annular strips having a flange on one edge integrally joined on the outer periphery of said anchor flanges, to form an annular cooling chamber, a partition in said chamber, and water inlet and outlet connections on opposite sides of said partition for circulating water in said chamber.

References Cited in the file of this patent

UNITED STATES PATENTS

| | | |
|---|---|---|
| 1,998,081 | Gerlich | Apr. 16, 1935 |
| 2,042,301 | Fox | May 26, 1936 |
| 2,121,686 | Currie | June 21, 1938 |
| 2,204,724 | Cope | June 18, 1940 |
| 2,664,098 | McInerney | Dec. 29, 1953 |